United States Patent [19]

Dileo et al.

[11] Patent Number: 5,655,251

[45] Date of Patent: Aug. 12, 1997

[54] WINDSHIELD WIPER ASSEMBLY HAVING ELECTRIC HEATING ELEMENTS

[76] Inventors: Frank Dileo, P.O. Box 1668, Bridgehampton, N.Y. 11932; Peter Michalos, 137 Hampton Rd., South Hampton, N.Y. 11968

[21] Appl. No.: 488,197

[22] Filed: Jun. 7, 1995

[51] Int. Cl.$^6$ ............................................. B60S 1/38
[52] U.S. Cl. ....................... 215/250.07; 15/250.06; 15/250.48; 15/250.451; 219/202; 219/548; 219/553
[58] Field of Search ................ 15/250.06, 250.07, 15/250.08, 250.09, 250.48, 250.05, 250.4, 250.41, 250.451, 250.452; 219/202, 203, 548, 504, 505, 749, 553

[56] References Cited

U.S. PATENT DOCUMENTS

| | | | |
|---|---|---|---|
| 2,063,375 | 12/1936 | Harvey et al. | 15/250.4 |
| 2,427,502 | 9/1947 | Marick | 15/250.06 |
| 2,686,247 | 8/1954 | Curless, Jr. | 15/250.06 |
| 2,908,028 | 10/1959 | Runton et al. | 15/250.48 |
| 3,408,678 | 11/1968 | Linker | 15/250.05 |
| 3,489,884 | 1/1970 | Waseleski, Jr. | 15/250.06 |
| 3,530,525 | 9/1970 | Abel | 15/250.07 |
| 3,545,028 | 12/1970 | Poland | 15/250.48 |
| 3,619,556 | 11/1971 | Deibel | 15/250.07 |
| 3,718,940 | 3/1973 | Bode | 15/250.06 |
| 3,936,901 | 2/1976 | Theckston | 15/250.04 |
| 3,948,811 | 4/1976 | Clary et al. | 15/250.07 |
| 3,958,295 | 5/1976 | Green et al. | 15/250.451 |
| 4,117,312 | 9/1978 | Johnson et al. | 219/548 |
| 4,194,261 | 3/1980 | Parkinson | 15/250.07 |
| 4,325,160 | 4/1982 | Burgess | 15/250.06 |
| 4,360,941 | 11/1982 | Mabie | 15/250.06 |
| 4,392,051 | 7/1983 | Goss et al. | 219/548 |
| 4,497,083 | 2/1985 | Nielsen, Jr. et al. | 15/250.06 |
| 4,603,451 | 8/1986 | VanSickle | 15/250.07 |
| 4,670,933 | 6/1987 | Toplenszky | 15/250.07 |
| 4,852,204 | 8/1989 | Wilson | 15/250.07 |
| 4,928,344 | 5/1990 | Bliss | 15/250.06 |
| 4,928,345 | 5/1990 | Meltzer et al. | 15/250.06 |
| 4,967,437 | 11/1990 | Morse | 15/250.07 |
| 5,221,828 | 6/1993 | Basheer et al. | 15/250.06 |
| 5,325,561 | 7/1994 | Kotlar | 15/250.06 |

FOREIGN PATENT DOCUMENTS 63-49571  3/1988  Japan ........................... 15/250.07

*Primary Examiner*—Gary K. Graham
*Attorney, Agent, or Firm*—Jerome D. Jackson

[57] ABSTRACT

A windshield wiper blade assembly providing having an electrical heating mechanism along the length of a wiper blade. The assembly can be trimmed to a length appropriate for a particular automobile.

18 Claims, 3 Drawing Sheets

WINDSHIELD WIPER ASSEMBLY HAVING ELECTRIC HEATING ELEMENTS

BACKGROUND OF THE INVENTION

1. Field of the Invention

This invention relates generally to a device for wiping automobile windshields, and, more particularly, to a heated windshield wiper assembly.

2. Description of Related Art

Conventional automobile windshield wiper blades may become rigid in cold weather, resulting in poor adhesion to the windshield and streaking. Electrically heated wiper blades have been proposed to address this problem, but such blades typically require awkward mounting and wiring assemblies.

SUMMARY OF THE INVENTION

It is an object of the present invention to provide a heated windshield wiper assembly that is relatively easy to install as a retrofit.

It is another object of the present invention to provide a heated windshield wiper assembly that can be easily customized to fit various sizes of wiper arms.

To achieve this and other objects of the present invention, a wiper assembly comprises a base defining a longitudinal dimension, a first surface groove, and a second surface groove opposing the first groove through the base; a first conductor extending along the base; a second conductor extending along the base; means for heating, coupled between the first conductor and the second conductor to define a current path transverse to the longitudinal dimension of the base, the heating means extending along most of the longitudinal dimension; and a flexible wiper element over the heating means.

According to another aspect of the present invention, an assembly comprises a base defining a first surface groove and a second surface groove opposing the first groove through the base; a first conductor extending along the base; a second conductor extending along the base; a plurality of heating elements, each coupled between the first conductor and the second conductor; and a flexible wiper element over the plurality of heating elements.

According to yet another aspect of the present invention, in a system having a windshield, an oscillating arm over the windshield, and an assembly comprising a base defining a longitudinal dimension, a first surface groove, and a second surface groove opposing the first groove through the base; a first conductor extending along the base; a second conductor extending along the base; means for heating, coupled between the first conductor and the second conductor to define a current path transverse to the longitudinal dimension of the base, the heating means extending along most of the longitudinal dimension; and a flexible wiper element over the heating means, a method of installing the assembly comprises the steps of reducing the length of the assembly, by removing a portion of the heating means, to produce a reduced assembly; and attaching the reduced assembly to the arm.

The accompanying drawings which are incorporated in and which constitute a part of this specification, illustrate embodiments of the invention and, together with the description, explain the principles of the invention, and additional advantages thereof.

DESCRIPTION OF THE PREFERRED EMBODIMENT

Figure 1:
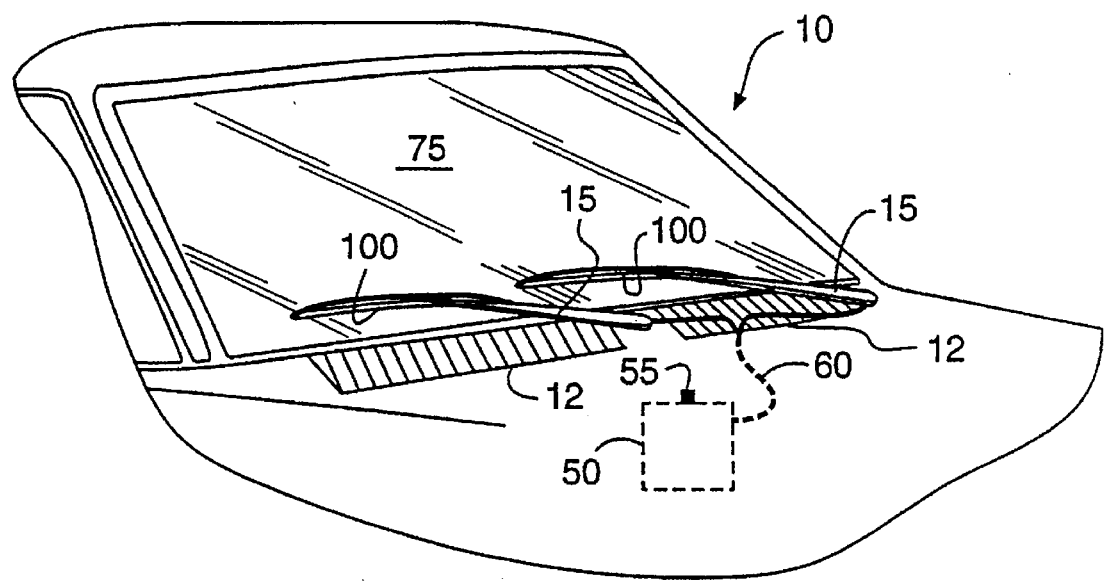
FIG. 1 is a perspective view of a windshield wiper system according to a preferred embodiment of the present invention.

FIG. 1 shows a windshield wiper system according to a preferred embodiment of the present invention, including automobile 10 having windshield 75, oscillating wiper arms 15, wiper assemblies 100 each attached to one of the wiper arms 15, controller 50 having manually operated switch 55, and cable 60 for transferring power from controller 50 to wiper assemblies 100. Controller 50 is mounted on the dashboard in the passenger compartment of automobile 10. Controller 50 supplies power for a predetermined period of time in response to actuation of switch 55 by the driver. Cable 60 runs from controller 50, through the dashboard (not shown) and hood air intake 12, to wiper assemblies 100.

Figure 2:
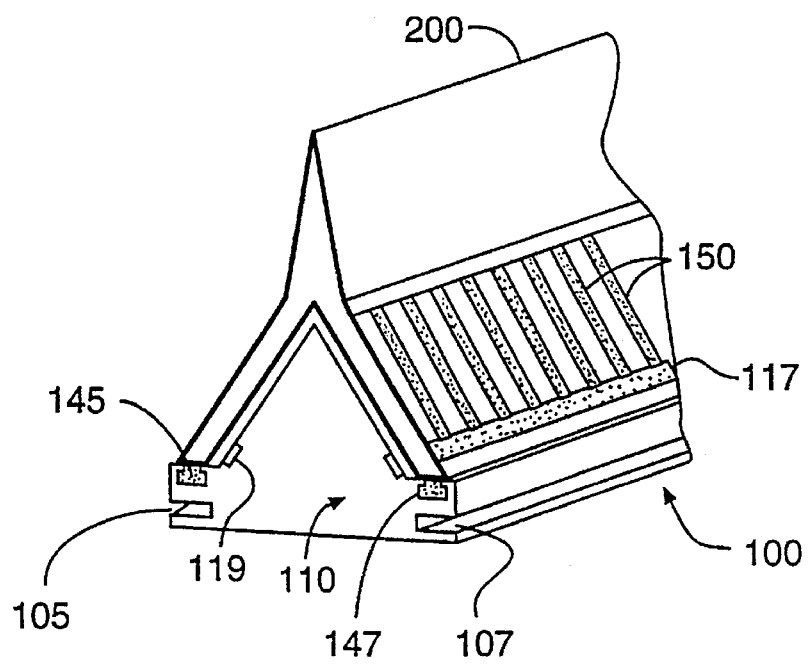
FIG. 2 is a perspective view of part of the wiper blade assembly of the preferred embodiment of the present invention.

FIG. 2 shows a perspective view of a portion of wiper assembly 100, including silicone wiper blade 200 drawn in phantom and base 110. Base 110 defines insertion tracks 105 and 107, running the entire length of base 110, that mate with rails on wiper arm 15. Base 110 includes heating elements 150, buss 117 connected to one end of each of heating elements 150, and buss 119 connected to the other end of each heating element 150. Busses 117 and 119 each run the entire length of base 110. Busses 117 and 119 have the same length and run parallel to each other.

Base 110 also defines wiper blade insertion tracks 145 and 147, running the entire length of base 110, for holding wiper blade 200.

Base 110 is composed of silicone rubber, which has relatively good insulation properties, allowing heat generated by heating elements 150 to be dissipated both in blade 200 and in base 110. Heat dissipation in base 110 melts accumulations of ice or snow that may form on the part of base 110 opposite blade 200, the part of base 110 facing away from windshield 75. Base 110 is more rigid than blade 200, because base 110 includes buss 117 and buss 119. Base 110, however, is sufficiently flexible to fit the curvature of an automobile windshield.

Figure 3:
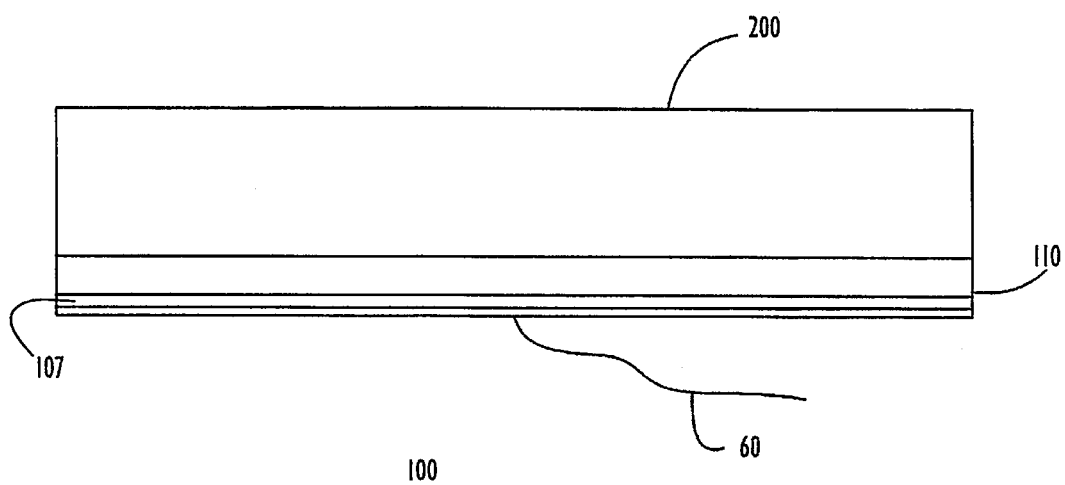
FIG. 3 is a side view of the preferred wiper blade assembly.

FIG. 3 is a side view of wiper blade assembly 100. FIG. 3 is not drawn to scale, as the preferred wiper blade has a longer length, relative to width, than indicated in FIG. 3.

Figure 4:
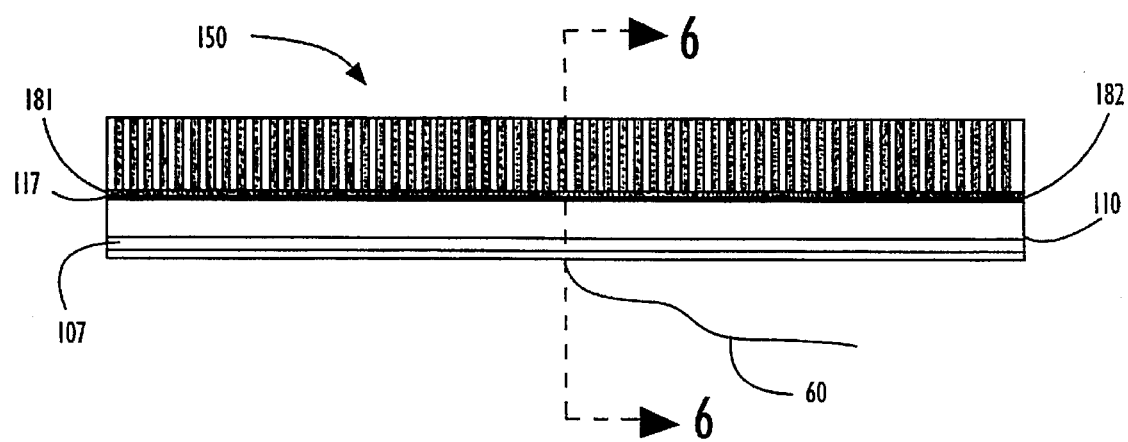
FIG. 4 is a side view of a base portion of the preferred wiper blade assembly.

FIG. 4 shows a side view of base 110 of wiper blade assembly 100.

Figure 5:
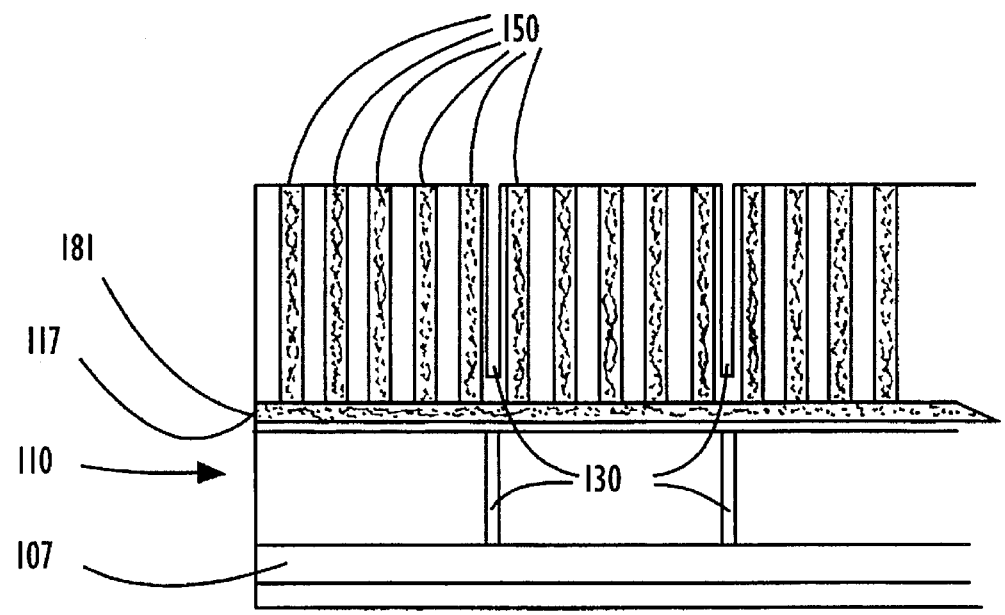
FIG. 5 is an enlarged view of part of the base portion shown in FIG. 4.

FIG. 5 is an enlarged view of a portion of base 110 shown in FIG. 4. Base 110 defines a plurality of notches 130 spaced at intervals along the length of base 110. Notches 130 make a number of weak points, allowing the user to trim the length base 110 for a particular automobile wiper arm, by breaking base 110 at one of the weak points. Heating elements 150 are between notches 130. In other words, base 110 defines a plurality of notches 130 transverse to the longitudinal dimension of base 110, a number of heating elements 150 being located between each adjacent notches. Parts of the base 110 aligned with a heating element 150 have a first mechanical strength, and parts of the base 110 aligned with the notches 130 have a mechanical strength lower than the first mechanical strength.

Controller 50 has sufficient power for the pretrimmed length of base 110. Trimming base 110 reduces the power requirement by removing some of the elements 150 connected in parallel between buss 117 and buss 119, thereby increasing the impedance between busses 117 and 119. Thus, a method of attaching assembly 100 to wiper arm 15 includes the steps of reducing the length of the assembly, by removing some of base 110 and some of heating elements 150, to produce a reduced assembly; and attaching the reduced assembly to wiper arm 15.

The user may tailor the length of wiper blade 200 by cutting wiper blade 200 with scissors or a knife.

Figure 6:
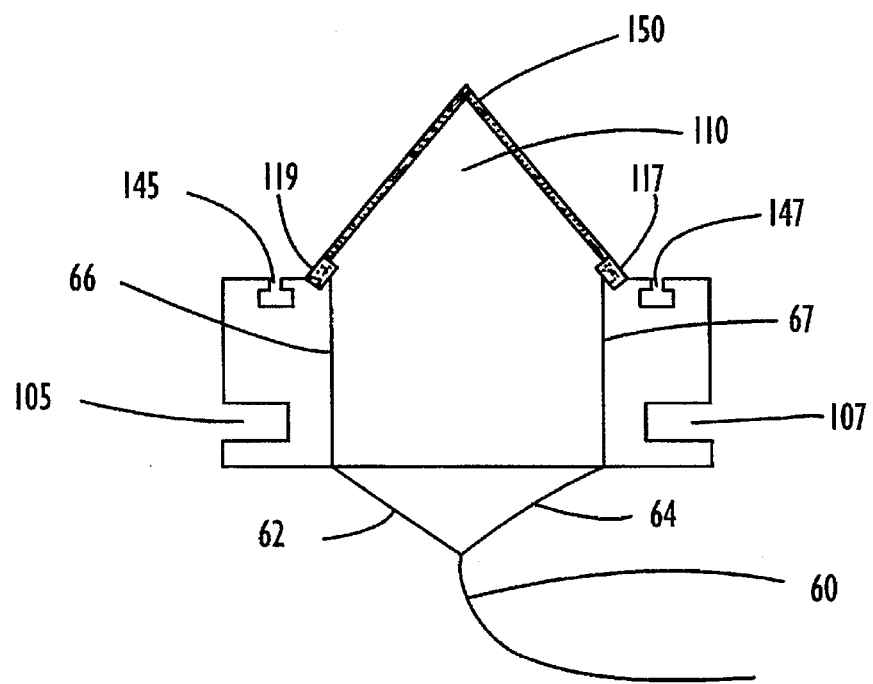
FIG. 6 is a cutaway view of the base portion shown in FIG. 4.

FIG. 6 is a cutaway view of base 110, taken along the line 6—6 shown in FIG. 4. Cable 60 includes 12 gauge copper wire 62 and 12 gauge copper wire 64. Wire 62 is mechanically and electrically coupled to internal conductor 66 by means of a screw (not shown) secured in base 110, and internal conductor 66 is electrically coupled to buss 119. Wire 64 is mechanically and electrically coupled to internal conductor 67 by means of another screw (not shown) secured in base 110, and internal conductor 67 is electrically coupled to buss 117. FIG. 6 shows a single heating element 150 electrically coupling buss 117 to buss 119. The remaining heating elements 150 are electrically coupled between buss 117 and buss 119 in a manner similar to the coupling shown in FIG. 6.

Wire 64 runs to controller 50. Wire 62 is grounded to the chassis of automobile 50.

As shown in FIGS. 2, 3, 4, 5, and 6, base 110 defines a longitudinal dimension, a surface groove 105, and a surface groove 107 opposing groove 105 through base 110. Buss 117 is composed of brass and extends across the entire longitudinal dimension of base 110. Buss 119 is composed of brass and extends across the entire longitudinal dimension of base 110. The heating elements 150 constitute a segmented heating mechanism extending along most of the longitudinal dimension of base 110. Each heating element 150 is composed of copper. Each heating element 150 has a first end electrically coupled to buss 117 and a second end electrically coupled to buss 119, thereby defining a current path perpendicular to the longitudinal dimension of base 110.

The electrical resistance per unit length of each heating element 150 is higher than the electrical resistance per unit length of buss 117. The electrical resistance per unit length of each heating element 150 is higher than the electrical resistance per unit length of buss 119.

In other words, wiper assembly 100 includes a base 110 defining a longitudinal dimension, a first surface groove 105, and a second surface groove 107 opposing the first groove through the base; a first conductor (buss 117) extending along the base; a second conductor (buss 119) extending along the base; and a plurality of heating elements 150, which act as a heating mechanism, coupled between the first conductor and the second conductor to define a current path transverse to the longitudinal dimension of base 110. As shown in FIG. 4, heating elements 150 are present along most of the longitudinal dimension of base 110.

Internal conductor 67 is attached to buss 117 at a midpoint between end 181 and 182 of buss 117. Some of heating elements 150 are attached to buss 117 between the end 181 and the midpoint. Others of heating elements 150 are attached to buss 117 between end 182 and the midpoint. In other words, buss 117 defines an end 181, an end 182, and a midpoint between ends 181 and 182. Some of the heating elements 150 are coupled to a portion of buss 117 between end point 181 and the midpoint, and others of heating elements 150 are coupled to a portion of buss 117 between end 182 and the midpoint. Wire 64 has a first end coupled to controller 50. Wire 64 has a second end coupled to the midpoint of buss 117 by way of internal conductor 67.

Similarly, internal conductor 66 is attached to buss 119 at a midpoint between first and second ends of buss 119. Some of heating elements 150 are attached to buss 119 between the first end and the midpoint. Others of heating elements 150 are attached to buss 119 between the second end and the midpoint. In other words, buss 119 defines a first end, a second end, and a midpoint between the first and second ends. Some of the heating elements 150 are coupled to a portion of buss 119 between the first end and the midpoint, and others of heating elements 150 are coupled to a portion of buss 119 between the second end and the midpoint. Wire 62 has an end coupled to the midpoint of buss 119 by way of internal conductor 66.

These midpoint connections to busses 117 and 119 minimize the amount of external wiring on wiper arm 15.

Although the illustrated wiper assembly includes a blade that is removably attached to a base having heating elements, the invention may be practiced with an assembly having a blade integrally formed with such a base. Such an integral formation would protect the heating elements from corrosion.

It is also contemplated that the blade assembly could include a thermostat, coupled to a controller that supplies power to the blade assembly.

Thus the preferred embodiment of the present invention provides a heated windshield wiper assembly that can be easily installed as a retrofit on a conventional automobile. Because the preferred assembly has a current path transverse to the length of the assembly, this current path is maintained over the length of the assembly even after the assembly is trimmed to a length appropriate for a particular automobile. Thus, the heating mechanism is maintained over the length of the assembly even after the assembly is trimmed to a length appropriate for a particular automobile.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A wiper assembly comprising:

a base defining a longitudinal dimension;

a first conductor coupled to the base and extending along most of the longitudinal dimension of the base;

a second conductor coupled to the base and extending along most of the longitudinal dimension of the base;

means for heating, coupled between the first conductor and the second conductor to define a current path transverse to the longitudinal dimension of the base, the heating means extending along most of the longitudinal dimension of the base, the heating means including a plurality of segments, each segment having a side portion opposed to an adjacent segment, the side portion and the adjacent segment defining a gap having a length greater than a distance between adjacent segments, the side portion being electrically insulated from the adjacent segment along the length of the gap, each segment defining a first end connected to the first conductor and a second end connected to the second conductor; and a flexible wiper element coupled to the base and extending along most of the longitudinal dimension of the base.

2. The wiper assembly of claim 1 wherein the base defines a groove and the wiper element is coupled to the base by engagement with the groove.

3. The wiper assembly of claim 1 wherein the base defines first and second grooves and the wiper element is coupled to the base by engagement with the first and second grooves.

4. The wiper assembly of claim 1 wherein the base defines a plurality of notches transverse to the longitudinal dimension, parts of the base midway between notches having a first mechanical strength, and parts of the base aligned with the notches having a mechanical strength lower than the first mechanical strength.

5. The wiper assembly of claim 1 wherein the first conductor defines a first end, a second end, and a midpoint between the first and second ends, wherein some of the segments are coupled to a portion of the first conductor between the first end and the midpoint, and others of the first heating elements are coupled to a portion of the first conductor between the second end and the midpoint, and wherein the wiper assembly further includes means for supplying electric power;

a wire having a first end coupled to the supplying means, and a second end coupled to the midpoint of the first conductor.

6. The wiper assembly of claim 1 wherein the wiper element defines an internal surface, and each of the plurality of segments defines a flat major surface facing the internal surface of the wiper element.

7. The wiper assembly of claim 1 wherein each of the plurality of segments defines a V shape.

8. The wiper assembly of claim 1 wherein each of the plurality of segments extends in a direction perpendicular to the longitudinal dimension of the base.

9. A wiper assembly comprising:

a base defining a longitudinal dimension;

a first conductor coupled to the base and extending along most of the longitudinal dimension of the base;

a second conductor coupled to the base and extending along most of the longitudinal dimension of the base;

a plurality of heating elements, each heating element having a side portion opposed to an adjacent element, the side portion and the adjacent element defining a gap having a length greater than a distance between adjacent elements, the side portion being electrically insulated from the adjacent element along the length of the gap, each heating element defining a first end coupled to the first conductor and a second end coupled to the second conductor; and a flexible wiper element coupled to the base and extending along most of the longitudinal dimension of the base.

10. The wiper assembly of claim 9 wherein the base defines a groove and the wiper element is coupled to the base by engagement with the groove.

11. The wiper assembly of claim 9 wherein the base defines first and second grooves and the wiper element is coupled to the base by engagement with the third and fourth grooves.

12. The wiper assembly of claim 9 wherein the first conductor has a first resistance per unit length and each heating element has a second resistance per unit length, the second resistance being higher than the first resistance.

13. The wiper assembly of claim 9 wherein the base defines a plurality of notches transverse to the longitudinal dimension, parts of the base midway between notches having a first mechanical strength, and parts of the base aligned with the notches having a mechanical strength lower than the first mechanical strength.

14. The wiper assembly of claim 9 wherein the base defines a plurality of notches transverse to the longitudinal dimension, the heating elements being located between each adjacent notch, and wherein parts of the base aligned with the heating elements having a first mechanical strength, and parts of the base aligned with the notches having a mechanical strength lower than the first mechanical strength.

15. The wiper assembly of claim 9 wherein the first conductor defines a first end, a second end, and a midpoint between the first and second ends, wherein some of the heating elements are coupled to a portion of the first conductor between the first end and the midpoint, and others of the heating elements are coupled to a portion of the first conductor between the second end and the midpoint, and wherein the wiper assembly further includes means for supplying electric power;

a wire having a first end coupled to the supplying means, and a second end coupled to the midpoint of the first conductor.

16. The wiper assembly of claim 9 wherein the wiper element defines an internal surface, and each of the plurality of heating elements defines a flat major surface facing the internal surface of the wiper element.

17. The wiper assembly of claim 9 wherein each of the plurality of heating elements defines a V shape.

18. The wiper assembly of claim 9 wherein each of the plurality of heating elements extends in a direction perpendicular to the longitudinal dimension of the base.

* * * * *